United States Patent [19]
Haddock et al.

[11] Patent Number: 6,034,957
[45] Date of Patent: *Mar. 7, 2000

[54] SLICED COMPARISON ENGINE ARCHITECTURE AND METHOD FOR A LAN SWITCH

[75] Inventors: Stephen R. Haddock, Los Gatos; David K. Parker, San Jose; Andrew H. Smith, Palo Alto; Erik R. Swenson, Campbell; Michael Yip, Sunnyvale, all of Calif.

[73] Assignee: Extreme Networks, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/028,304
[22] Filed: Feb. 24, 1998

Related U.S. Application Data
[60] Provisional application No. 60/057,402, Aug. 29, 1997.

[51] Int. Cl.[7] .................................................. H04L 12/54
[52] U.S. Cl. ......................... 370/392; 370/428; 370/474
[58] Field of Search .................................... 370/254, 255, 370/256, 257, 258, 389, 392, 393, 401, 402, 403, 404, 405, 409, 465, 470, 471, 474, 475, 476, 428, 429; 395/200.72, 200.75, 200.76, 200.79, 200.8; 709/242, 245, 246, 249, 250

[56] References Cited

U.S. PATENT DOCUMENTS

| | | | |
|---|---|---|---|
| 5,111,453 | 5/1992 | Morrow | 370/401 |
| 5,247,620 | 9/1993 | Fukuzawa et al. | 395/200.75 |
| 5,343,471 | 8/1994 | Cassagnol | 370/401 |
| 5,414,704 | 5/1995 | Spinney | 370/389 |
| 5,471,472 | 11/1995 | McClure et al. | 370/402 |
| 5,477,547 | 12/1995 | Sugiyama | 370/401 |
| 5,526,363 | 6/1996 | Weiss et al. | 370/118 |
| 5,615,340 | 3/1997 | Dai et al. | 395/200.8 |
| 5,649,109 | 7/1997 | Griesmer et al. | 395/200.72 |
| 5,701,418 | 12/1997 | Luitje | 395/200.75 |
| 5,708,659 | 1/1998 | Rostoker et al. | 370/392 |
| 5,802,320 | 9/1998 | Baehr et al. | 395/200.79 |

Primary Examiner—Tesfaldet Bogure
Assistant Examiner—Kwang B. Yao
Attorney, Agent, or Firm—Blakely Sokoloff Taylor & Zafman, LLP

[57] ABSTRACT

A packet switching device having a central shared memory and a number of medium access controllers each coupled to a communications medium to exchange data packets therewith, and a controller coupled to each medium access controller via a data path to exchange data packets with the media access controller. The controller has a number of data path controllers each connected to each medium access controller via a separate and like portion of the data path to exchange a corresponding portion of the data packets with the medium access controller. The data path controllers each have a number of buffers each connected to one of the medium access controllers to which the data path controller is connected, to hold the portion of the data packets exchanged with the corresponding medium access controller. Each data path controller has a selector that selects the buffer from which to transmit or receive the portion of the data packets with the central shared memory and control logic that controls the selector to concurrently select the buffer corresponding to the same medium access controller. A comparison engine associated with each data path controller detects the slice of a field in a data packet buffered in the corresponding data path controller and computes a hashing function on the contents of the slice of the field to generate a hash key. A packet forwarding controller reads one or more entries from a hash bucket in a forwarding database indexed by the hash key and sends the entries to the comparison logic. The comparison logic compares the slice of the field in the buffer to each of the entries and returns the results of the compare to a packet forwarding controller. The forwarding controller then forwards, filters or identifies packets based on the results of the comparisons done on each slice of a field in the packets.

21 Claims, 8 Drawing Sheets

SLICED COMPARISON ENGINE ARCHITECTURE AND METHOD FOR A LAN SWITCH

This application claims the benefit of U.S. Provisional Application No. 60/057,402, filed Aug. 29, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of Local Area Network (LAN) switching. In particular, the present invention relates to a scaleable data path architecture and a data comparison engine utilized in filtering and forwarding data packets by a LAN switch operating in high speed LANs such as a Gigabit Ethernet LAN.

2. Description of the Related Art

Initial, or first generation, LAN switches solved congestion problems associated with traditional LANs that arose as workgroups and networks, such as an Ethernet (operating at 10 million bits per second (10 Mb/s)), grew. (The term Ethernet LAN, or simply Ethernet, as used herein shall apply to LANs adhering to the Carrier Sense, Multiple Access with Collision Detection (CSMA/CD) standard, generally operating at a signaling rate of 10 Mb/s over various media types and transmitting Ethernet formatted or Institute of Electrical and Electronic Engineers (IEEE) standard 802.3 formatted data packets). Adding new users and deploying new applications required more bandwidth (i.e., data transfer capability as that term is applied to networks) than Ethernet LANs could reasonably provide. The result was slow performance primarily due to network congestion. Initial Ethernet switches reduced the congestion by segmenting workgroups into different LANs having separate collision domains and switching traffic, i.e., data packets, between the workgroups at very high speeds.

Deployment of first generation Ethernet switches and growth of the client/server computing model moved the primary network performance bottleneck from the end station to the Ethernet switch port connected to, for example, a high-performance server. Second generation Ethernet switches added a port connected to a relatively high-speed communications medium, commonly referred to as a backbone. Connecting a port on the Ethernet switch to a backbone operating according to a high-speed technology such as Fiber Distributed Data Interface (FDDI), Asynchronous Transfer Mode (ATM), or Fast Ethernet, opened up the bottleneck allowing traffic from many clients connected to the Ethernet switch to be switched efficiently at the connection to the server or backbone. (The term Fast Ethernet LAN, or simply Fast Ethernet, as used herein shall apply to LANs adhering to the Carrier Sense, Multiple Access with Collision Detection (CSMA/CD) standard, generally operating at a signaling rate of 100 Mb/s over various media types and transmitting Ethernet formatted or Institute of Electrical and Electronic Engineers (IEEE) standard 802.3 formatted data packets).

Until recently, network traffic patterns in the client/server network model were generally predictable. Most traffic remained on a local LAN as clients accessed local servers. Occasionally, a small percentage of traffic, for example, electronic mail, went outside the workgroup connected to a common shared communications medium. Today, intranet, Internet, and World Wide Web (WWW) communication have significantly changed traffic patterns. Data can now exist and be randomly accessed anywhere, in contrast to the traffic patterns in traditional client/server networks. Additionally, more powerful applications and computers capable of providing, for example, video and multimedia at the desktop end station are driving the need for greater network speed and bandwidth.

Signaling rates associated with very high-speed technologies such as Gigabit Ethernet and the rapid assimilation of more powerful applications and computers relying on intranet or Internet communication have driven the need for next generation of LAN switches. (The term Gigabit Ethernet LAN, or simply Gigabit Ethernet, as used herein shall apply to LANs adhering to the Carrier Sense, Multiple Access with Collision Detection (CSMA/CD) standard, generally operating at a signaling rate of 1,000 Mb/s over various media types and transmitting Ethernet formatted or Institute of Electrical and Electronic Engineers (IEEE) standard 802.3 formatted data packets).

What is needed is a highly scaleable LAN switch capable of resolving today's congestion problems, handling delay-sensitive and real-time data, scaling network size to support thousands of users, and aggregating the different speeds of traffic through the network. A third generation LAN switch extends the evolutionary migration from 10 Mb/s CSMA/CD (Ethernet) to 100 Mb/s CSMA/CD (Fast Ethernet) to 1,000 Mb/s CSMA/CD (Gigabit Ethernet) backbones. Such network scalability is important to LAN design and migration, allowing optimization of the network by providing high-speed links for trunking and server connections while maintaining performance at the desktop.

Thus, third generation LAN switches should be capable of providing sufficient bandwidth within the switch to remove any possibility of contributing to network congestion. The switch should be capable of switching multiple high-speed and low-speed ports simultaneously without any blocking throughput on any port. Furthermore, the switch should guarantee full bandwidth availability at all times. The switch capacity, in particular, the backplane capacity of the switch, should be greater than the sum of all its ports so data packets are never dropped or lost even when the network load requires all ports to support, for example, full-duplex gigabit bandwidth. Additionally, the switch should be capable of bridging (at the Media Access Control (MAC) layer) or routing (at the Network layer) data packets at least as fast as the data transmission speed of the communication media to which it is attached.

Various third generation LAN switch architectures have several key differences in LAN switch implementations. For example, a so-called Gigabit Ethernet switch may simply utilize a number of Fast Ethernet ports, e.g., 6 Fast Ethernet ports, and include a single Gigabit Ethernet port. Such a switch needs only to provide internal bandwidth capacity somewhere in the range of 1–2 gigabits per second, which is generally within the capability of any LAN switch, regardless of the switch architecture, but fails to provide the desired scalability referred to above or guaranteed bandwidth availability.

What is needed is a switch architecture that readily supports multiple Fast Ethernet ports and/or a number of Gigabit Ethernet ports, for example, 64 Fast Ethernet ports, or 8 Gigabit Ethernet ports, or a combination thereof. Traditional LAN switch architectures, such as central shared memory-, crossbar switch-, or bus-based architectures generally have a maximum internal bandwidth capability of 2 Gigabits per second (Gb/s). 2 Gb/s bandwidth appears to be a threshold above which scaling such traditional switch architectures is generally not feasible. Thus, given a LAN switch having, for example, 8 Gigabit Ethernet ports, these traditional architectures are generally incapable of providing sufficient bandwidth within the switch to remove any possibility of contributing to network congestion, switching multiple high-speed and low-speed ports simultaneously without any blocking throughput on any port, and providing full bandwidth availability at all times.

As an example, some prior art bus-based switches have utilized a backplane bus operating according to the well known Peripheral Component Interconnect (PCI) local bus standard. The PCI bus can exchange data at either 32 or 64 bits per clock cycle, depending on the implementation. Operating at a speed of 33 MHz, a 32-bit wide PCI bus is therefore generally capable of achieving 1 Gb/s bandwidth, while a 64-bit wide PCI bus is generally capable of achieving 2 Gb/s bandwidth. Scaling the clock speed of the PCI bus to 66 MHz to achieve a bit rate of 4 Gb/s is possible, but is generally thought to be the maximum rate at which the PCI bus can operate. Thus, a different architecture is necessary to provide greater internal bandwidth for a switch than achieved with a PCI bus-based architecture.

A central shared memory architecture lends itself to greater internal bandwidth than a bus-based architecture, and provides greater flexibility in terms of allocating buffers among ports, and reasonable control over allocation of memory resources. However, present switch implementations based on traditional central shared memory architectures are prohibitively expensive when scaled to meet the needs of a switch supporting a significant number of Gb/s ports.

One method of achieving significantly greater internal bandwidth requires scaling the central shared memory architecture such that the data bus providing access to memory is scaleable to very wide bus widths, on the order of, e.g., 256 bits, 512 bits, or even higher. Data path circuitry providing such a wide data bus for transferring data between the ports and the central shared memory is difficult and expensive to implement on a single Integrated Circuit (IC) chip due to pin count. For example, implementing a data path circuit supporting multiple ports and a 512-bit wide data path on a single IC yields a pin count in excess of 1000 pins on the IC. Multiple IC chips each having fewer pins is substantially less expensive to manufacture than a monolithic IC chip with a massive pin count given present IC manufacturing technologies. What is needed, then, is a scaleable data path architecture for a central shared memory architecture-based LAN switch that lends itself to implementation on a number of IC chips.

BRIEF SUMMARY OF THE INVENTION

Disclosed is a data path architecture for a central shared memory architecture-based LAN switch. The switch embodied by the present invention is capable of providing sufficient bandwidth within the switch to remove any possibility of contributing to network congestion. Furthermore, the switch is capable of switching multiple high-speed and low-speed ports simultaneously without any blocking throughput on any port. Additionally, the switch provides full bandwidth availability at all times. The switch capacity, in particular, the backplane bandwidth capacity of the switch, is greater than the sum of bandwidth capacity for all its ports so data packets are never dropped or lost even when the network load requires all ports to support full-duplex gigabit per second bandwidth. The switch bridges and routes data packets at wire speed, i.e., at least as fast as the data transmission speed of the communication media to which it is attached.

A LAN switch utilizing a data path architecture according to an embodiment of the present invention is highly scaleable. Moreover, the data path circuitry lends itself well to implementation on a number of IC chips rather than a single IC chip, thereby significantly reducing the expense of such circuitry. According to an embodiment of the present invention, the data path architecture is sliced into a number of data path controllers that may be manufactured on a like or less number of IC chips.

Each media access controller, or port, in the LAN switch is connected to the data path architecture by a full-duplex data path or channel. Each data path controller comprises a number of subpaths each connecting the data path controller to a slice of each full-duplex data path, such that each data path controller is responsible for transferring slices of data packets received from each media access controller to the central shared memory via a separate subpath. Likewise, each data path controller transfers slices of data packets received from the central shared memory to each media access controller via separate subpaths. Additionally, a packet forwarding and filtering controller utilizes a sliced comparison engine that leverages off of the sliced data path architecture to provide fast packet identification, filtering and switching.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention relates to a scaleable sliced data path architecture and a sliced data comparison engine for data packet forwarding by a LAN switch operating in high speed LANs such as a Gigabit Ethernet LAN. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

Overview of LAN Switch Architecture

Figure 1:
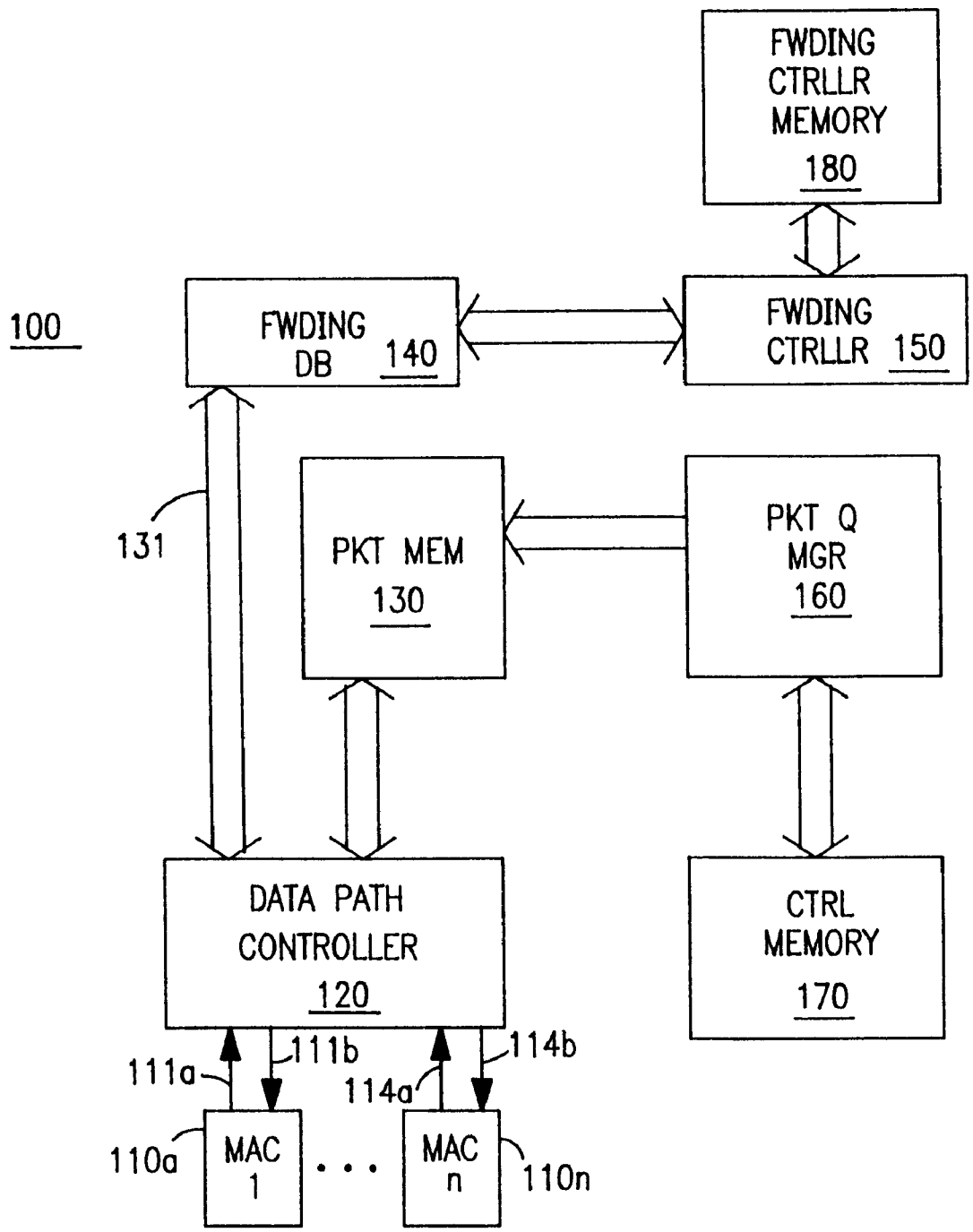
FIG. 1 is a diagram of a packet switch as may be utilized by an embodiment of the present invention.

With respect to FIG. 1, a block diagram of a LAN packet switch 100 is provided in which the present invention is embodied. The LAN packet switch, or simply switch, implements a central shared memory-based architecture that supports multiple high-speed ports, or Media Access Controllers (MACs), 110a through 110n. In one embodiment, the MACs each operate at a half-duplex data transfer rate of 1,000,000,000 bits per second, or 1 Gigabit per second (Gb/s), according to the IEEE draft standard 802.3 z/D3.1, which extends the well-known 802.3 protocol and MAC specification to an operating speed of 1,000 Mb/s over a baseband communications medium, herein referred to as Gigabit Ethernet. In another embodiment, the MACs each operate at a data transfer rate of 100,000,000 bits per second, or 100 Mb/s, according to the IEEE standard 802.3u, which extends the well-known 802.3 protocol and MAC specification to an operating speed of 100 Mb/s over a baseband communications medium, herein referred to as Fast Ethernet. It is appreciated that the MACs may operate according to other communication protocols, such as the well-known Fiber Distributed Data Interface (FDDI) or Asynchronous Transfer Mode (ATM) communication protocols.

The switch 100 illustrated in FIG. 1 is configured to support MACs 110a through 110n where n is generally dependent on the operating speed and bandwidth requirements of each of the MACs relative to the internal bandwidth capacity of the switch. In particular, the switch supports 16 Gb/s internal bandwidth in one embodiment, scaleable to 32 Gb/s internal bandwidth in another embodiment, the latter of which is more than sufficient to support 8 full-duplex gigabit channels at 2 Gb/s bandwidth each. Each channel is thus capable of supporting one full-duplex Gigabit Ethernet MAC, wherein a receive data path, e.g., 111a, receives data at a rate of 1 Gb/s from a Gigabit Ethernet MAC, and a transmit data path, e.g., 111b, transmits data at a rate of 1 Gb/s to the Gigabit Ethernet MAC. Each channel is alternately capable of supporting 8 Fast Ethernet MACs, 8 FDDI ports, 6 OC-3 ATM ports, or one OC-12 ATM port. (In theory, each channel is capable of supporting 10 Fast Ethernet (FE) MACs, but as a practical matter, only 8 FE MACs are utilized in an embodiment of the present invention due to timing constraints). The paths are further sliced into multiple subpaths over which data is routed by path controller 120 into the central shared memory, referred to in the figure as packet memory 130, according to commands received from packet queue manager (PQM) 160. As will be seen, embodiments of the present invention may slice the paths in to 1, 2, 4, 8 or 16 subpaths to create switch configurations with 2 to 32 Gb/s internal bandwidth to the packet memory 130 and 1 to 16 full-duplex paths operating at a data transmission speed of 2 Gb/s.

As discussed further in detail below, a forwarding database 140 contains tables related to packet or flow identification, forwarding and filtering, and stores in the tables addresses and other well-known fields obtained from packets transferred by path controller 120. A packet forwarding controller 150 maintains the tables in forwarding database 140 and decides which packets or flows are identified, filtered, or forwarded, utilizing a comparison engine sliced according to and associated with each of the number of subpath controllers.

Switch Architecture Utilizing Sliced Data Path Architecture

Figure 2A:
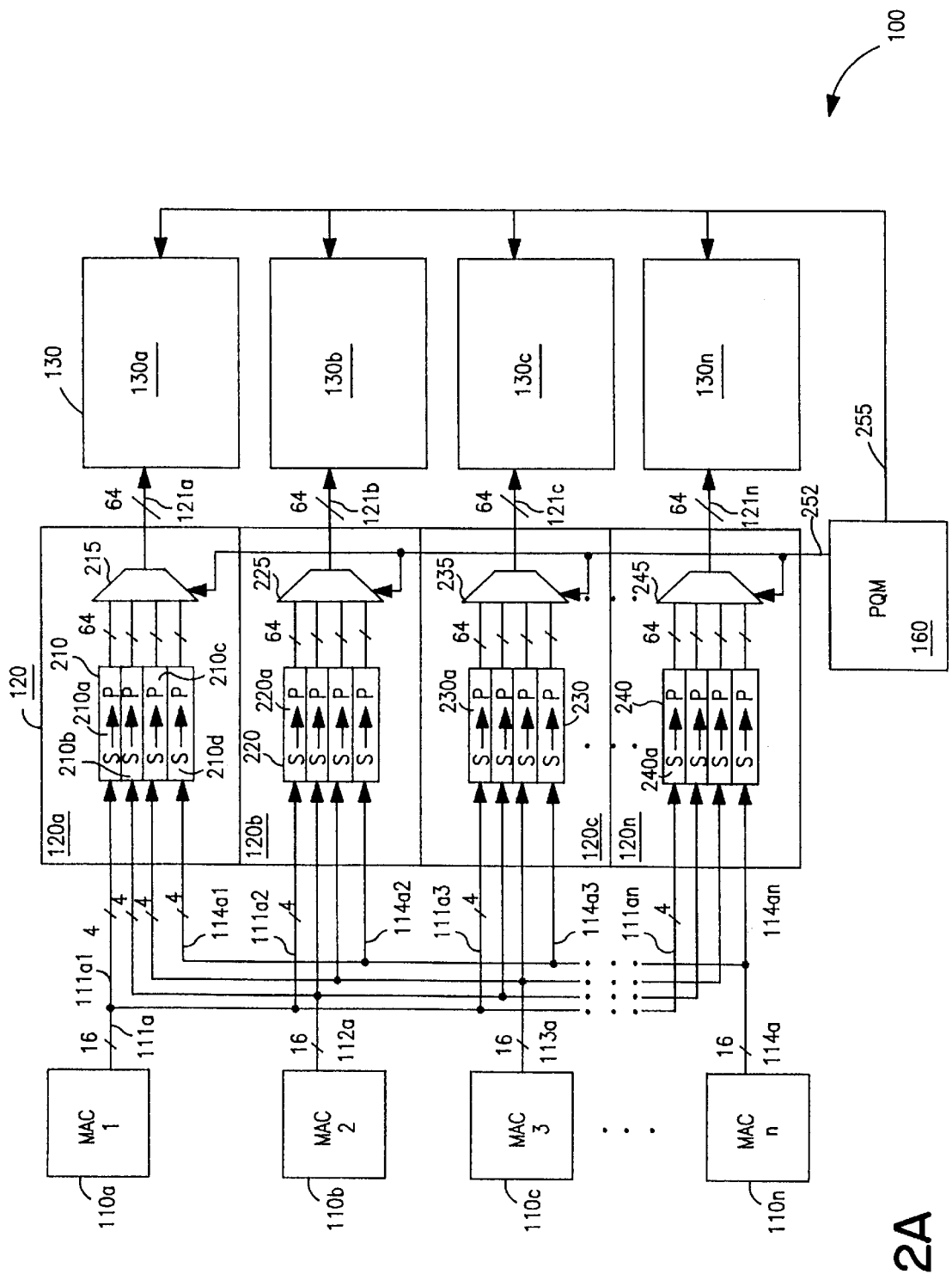
FIG. 2A is a block diagram of an embodiment for receiving data packets at a medium access controller and transferring the same to a central shared memory of a LAN switch according to the present invention.

With reference to FIG. 2A, a block diagram of an embodiment of the data path architecture utilized by a LAN switch in accordance with the present invention is illustrated. In the illustrated embodiment, m-bit wide receive data paths ("paths") 111a through 114a couple MACs 110a through 110n to path controller 120, wherein m equals 16 bits. In one embodiment, the paths operate at 66.7 MHz, thus providing slightly more than 1 Gb/s in the receive direction. Path controller 120 is sliced into a number of subpath controllers, in this case, 4 subpath controllers. Likewise, paths 111a through 114a are sliced into an equal number of n-bit wide receive data subpaths ("subpaths"), wherein n equals 4, and wherein n times the number of subpath controllers equals m. Each subpath belonging to a particular path is routed to a different subpath controller. Thus, for example, 16-bit receive data path 111a is sliced into 4-bit subpaths 111a1, 111a2, 111a3 and 111an respectively connected to separate subpath controllers 120a, 120b, 120c and 120n. In the same manner, 16-bit receive data path 112a is sliced into 4-bit subpaths 112a1 through 112an connected to subpath controllers 120a through 120n. Thus, subpath controllers 120a through 120n each receive separate slices of data packets from each of MACs 110a, 110b, 110c and 110n.

The subpath controllers 120a through 120n are each coupled to packet memory 130 via a respective x-bit wide receive data bus 121a through 121n, collectively data bus 121. In one embodiment of the present invention, the width of data bus 121 connecting the subpath controllers to packet memory 130 is double the sum of the width of the receive and transmit data paths coupling the MACs to path controller 120. Thus, in the 4 subpath (4 slice) embodiment illustrated in FIG. 2A, the data bus 121 is 256 bits wide, while, with reference to FIG. 2C, the data bus 121 in the 8 subpath (8 slice) embodiment is 512 bits wide. It is appreciated that in a 16 subpath configuration, a 1024 bit wide data bus connects the subpath controllers to packet memory 130.

The subpath controllers each contain separate receive buffers coupled to each subpath to receive data therefrom. In the receive data direction (from the MAC to packet memory), each subpath controller accumulates at least x bits of data in the receive buffer from its associated receive data subpath until it can transfer the bits of data to packet memory 130, wherein x is a multiple of n, i.e., a multiple of the number of bits in the receive data subpath. (In the embodiments disclosed herein, x=64 bits). For example, subpath controller 120a contains buffer 210, separated into receive buffers 210a, 210b, 210c and 210d that respectively receive slices of data packets from MACs 110a, 110b, 110c and 110n, over subpaths 111a1, 112a1, 113a1 and 114a1. Likewise, subpath controller 120b receives slices of data packets from MACs 110a, 110b, 110c and 110n into receive buffers 220a through 220d via subpaths 111a2, 112a2, 113a2, and 114a2.

The receive buffers operate as serial-to-parallel bit stream converters, and burst x bits of data in parallel to packet memory. The x bits contain n-bit slices of a data packet received from a MAC connected to the corresponding subpath. The data streams from each subpath are written to memory under the control of packet queue manager (PQM) 160. PQM 160 generates the memory address locations at which the slices of data received from the MACs are stored in packet memory 130, in particular, at memory banks 130a, 130b, 130c and 130n. A selector 215, 225, 235 and 245 in respective subpath controllers 120a, 120b, 120c and 120n simultaneously selects receive buffers corresponding to subpaths of the same path and forwards the slices of data held therein to packet memory 130 over data bus 121.

For example, PQM 160 asserts an offset memory address over address bus 255 to indicate the location within each memory bank 130a through 130n at which to store x bits of a data packet. PQM 160 also asserts a signal over control line 252 causing selectors 215, 225, 235 and 245 to simultaneously forward bit streams of x bits held in the receive buffers corresponding to the subpaths for each path, e.g., receive buffers 210a, 220a, 230a and 240a corresponding to subpaths 111a1, 111a2, 111a3 and 111an. Subpaths 111a1, 111a2, 111a3 and 111a4 comprise path 111a from MAC 110a. The bit streams are collectively and simultaneously forwarded over data bus 121, wherein each bitstream is stored in discontiguous memory locations. PQM then selects another set of subpaths, associated with another path, from which to obtain slices of a data packet from another MAC, e.g., MAC 110b, followed by selecting and writing slices from MACs 110c and 110n.

Figure 2B:
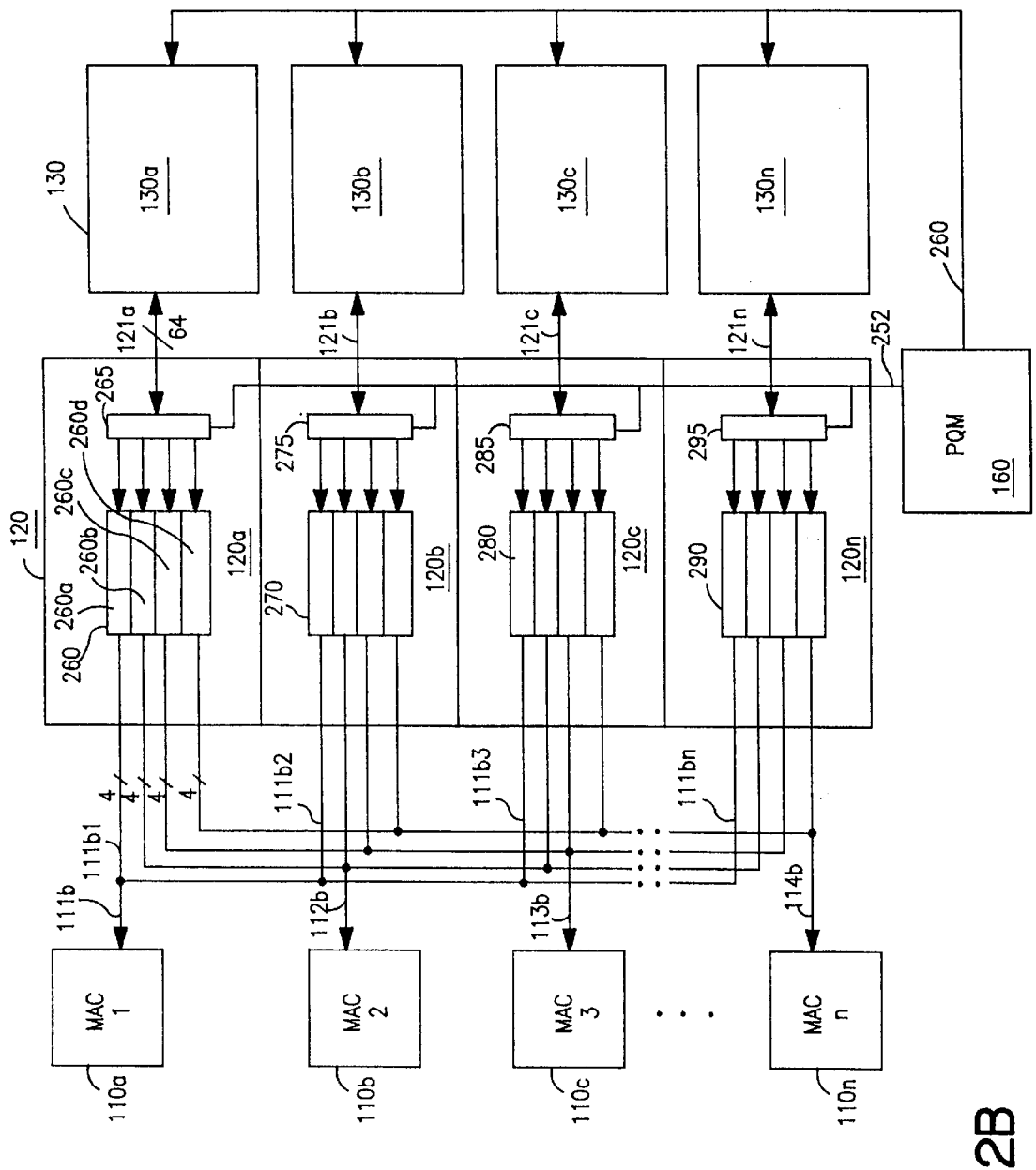
FIG. 2B is a block diagram of an embodiment for transferring data packets from a central shared memory to a medium access controller of a LAN switch for transmission onto a communications medium according to the present invention.

With reference to FIG. 2B, m-bit wide transmit data paths ("paths") 111b through 114b couple path controller 120 to MACs 110a through 110n, wherein m equals 16 bits. As in the case of the receive data paths discussed above with respect to FIG. 2A, the transmit data paths operate at 66.7 MHz, thus providing slightly greater than 1 Gb/s in the transmit direction, for a total of 2 Gb/s full-duplex data transmission rate, per full-duplex path. In the transmit data direction, the switch operates in a similar but opposite manner as described above with respect to the receive data direction. The subpath controllers each read x-bit (e.g., 64-bit) bursts from packet memory 130 over data bus 121, wherein each burst represents multiple slices of a data packet. The subpath controllers send the data on the subpaths corresponding to a particular MAC. The memory addresses for the memory locations from which the memory reads are performed are generated by PQM 160 and transmitted over address bus 260, in response to status and control signals from the subpath controllers and the paths (not shown).

An alternative embodiment of data path controller 120 is now described with reference to FIG. 2C. The figure illustrates only the receive data paths; circuitry and data paths not shown but similar to FIG. 2B, that is, for the transmit direction, also exist for this embodiment. The embodiment slices data path controller 120 into a number of subpath controllers 120a through 120n, in this case, 8 subpath controllers. Data paths, each m bits wide (wherein m=16), are likewise sliced into an equal number of n-bit wide receive subpaths, wherein n equals 2 and n times the number of subpath controllers equals m. The subpaths corresponding to a particular path are connected to different subpath controllers such that each subpath controller is connected to and receives slices of data from each MAC via a separate subpath. For example, subpath controller 120a receives slices of data from MAC 110 via subpath 111a1, slices of data from MAC 110b via subpath 112a1, slices of data from MAC 110c via subpath 113a1, and so on. Thus, whereas the "four slice" embodiment depicted in FIG. 2A, i.e., the four subpath controller embodiment, routes four 4-bit wide subpaths, each from a different MAC, to the same subpath controller, the eight-slice embodiment depicted in FIG. 2C routes eight 2-bit wide subpaths, each from a different MAC, to the same subpath controller.

Two-bit slices of data are received over each subpath and stored in a receive buffer associated with the subpath. The receive buffers convert the bit slices to a x-bit wide parallel bit stream for transmission to packet memory 130 at the appropriate time as controlled by PQM 160. PQM 160 controls selectors 216 through 222 to gate slices of the same data packet from each subpath controller at the same time. Thus, for example, the selectors select and forward slices from the first subpath of each subpath controller, then the second subpath, and so on. The slices are stored in separate locations in packet memory 130 at memory addresses identified by and driven on to address bus 255 by PQM 160 in setting up the data transfer to memory.

Figure 2C:
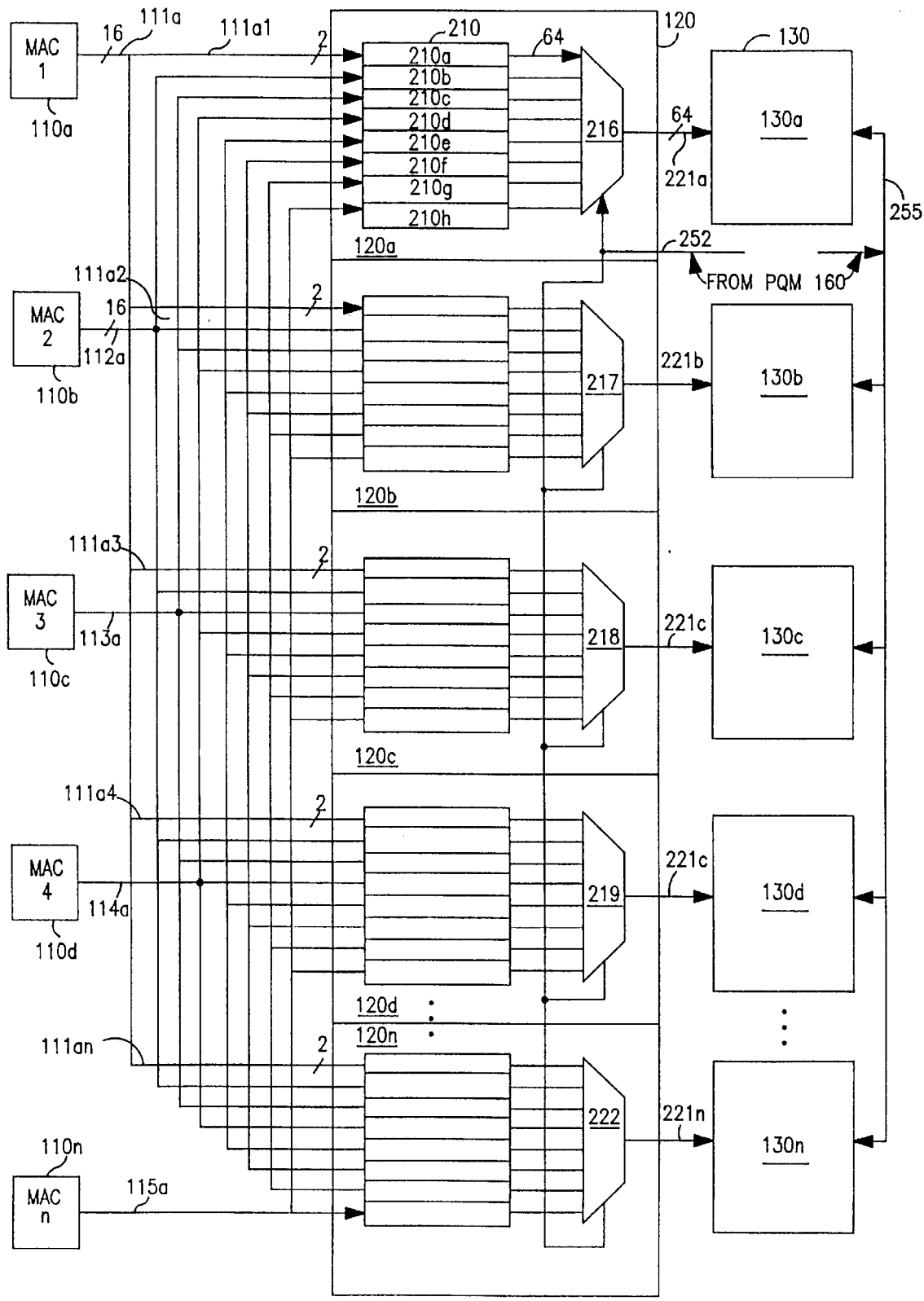
FIG. 2C is diagram of another embodiment for receiving data packets at a medium access controller and transferring the same to a central shared memory of a LAN switch according to the present invention.
Figure 2D:
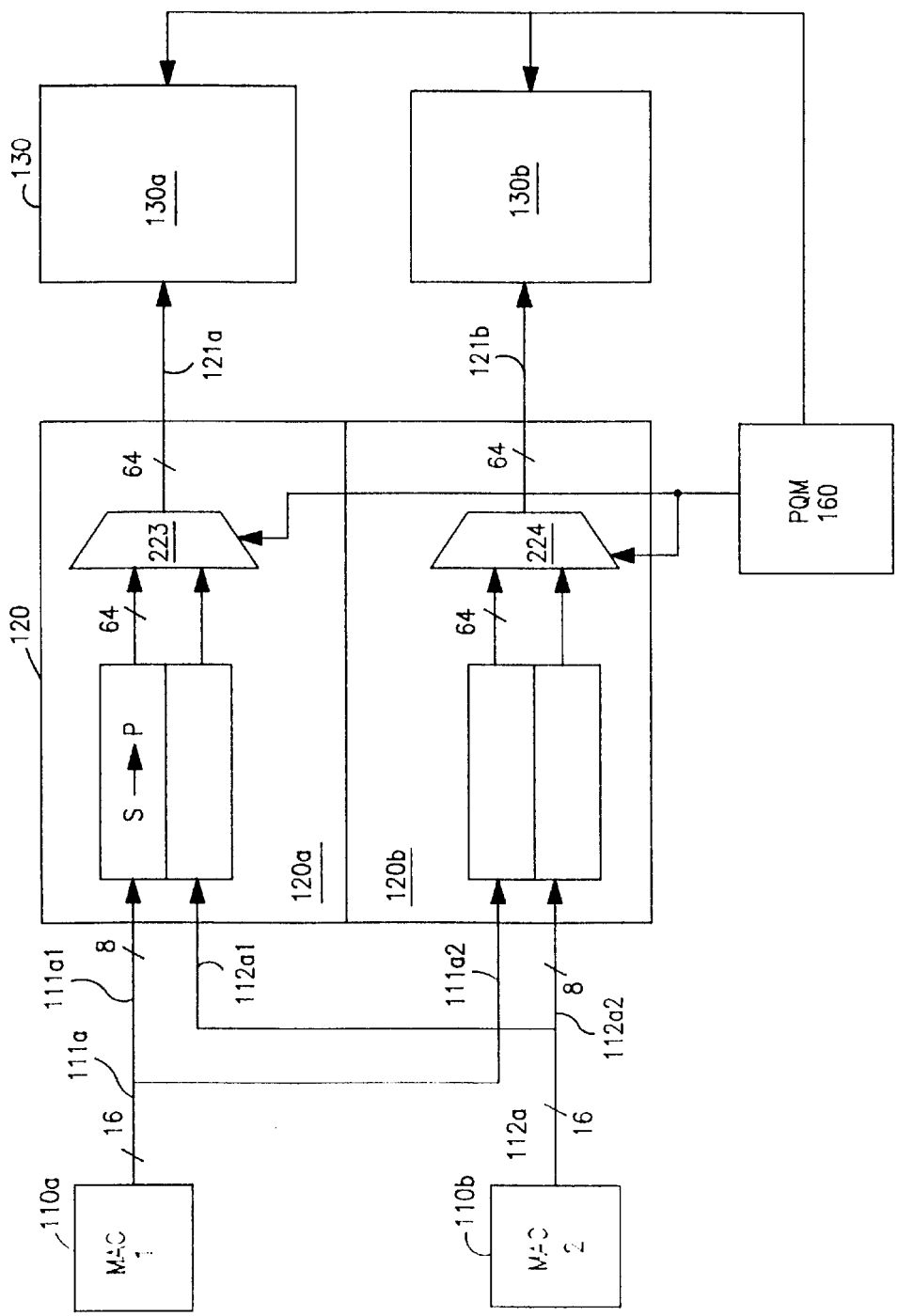
FIG. 2D is a diagram of an embodiment for receiving data packets at a medium access controller and transferring the same to a central shared memory of a LAN switch according to the present invention

FIG. 2D illustrates a data path controller embodiment wherein the data path controller is sliced in to two subpath controllers. Only the receive data paths and corresponding subpath controller architecture is shown. Transmit data paths and subpath controllers similar to that depicted in FIG. 2B are not shown. The embodiment operates according to the same steps described above with reference to the four and eight slice implementations. A description of the two slice embodiment is therefore left to the reader.

It is noted that in each of the embodiments described herein, none of the subpath controllers receive or transmit an entire data packet, nor does memory store an entire data packet in contiguous locations within packet memory. However, it is appreciated that so long as corresponding receive and transmit data subpaths and symmetrical transfer operations are utilized in receiving slices of data in memory or transmitting slices of data out of memory as described above, data packets can be sliced and transferred in any conceivable manner. Thus, according to the present invention, slices of a data packet may be stored in separate buffers associated with separate subpaths and then transferred into separate memory regions in a timesliced manner. The data path controller and packet queue manager ensure the slices of the same data packet received from a particular MAC are written to memory at the same time.

In general, the different embodiments of the data path controller architecture process data packets equally efficiently. However, as will be described, short length packets, e.g., a minimum packet of 65 bytes in length, or odd length packets where, for example, after simultaneously transferring slices of a data packet to memory through the data path controller, a residual byte remains to be transferred to packet memory, are processed more efficiently by the four versus eight slice embodiment.

A 65 byte packet comprising 520 bits takes 32.5 clock cycles to be transferred over a 16-bit bus such as the receive data or transmit data paths connecting each MAC to the data path controller. However, utilizing the four slice embodiment of the present invention, a LAN switch can read or write 512 of the 520 bits from/to packet memory in two clock cycles over data bus 121, leaving a residual 8 bits to transfer on a third clock cycle. Likewise, an eight slice embodiment can transfer 512 bits of a data packet in a single clock cycle, also leaving a residual 8 bits to transfer on a subsequent clock cycle. The process of transferring the residual 8 bits will now be described with reference to more detailed illustrations of the subpath controller in both the four and eight slice embodiments of the present invention.

Figure 4:
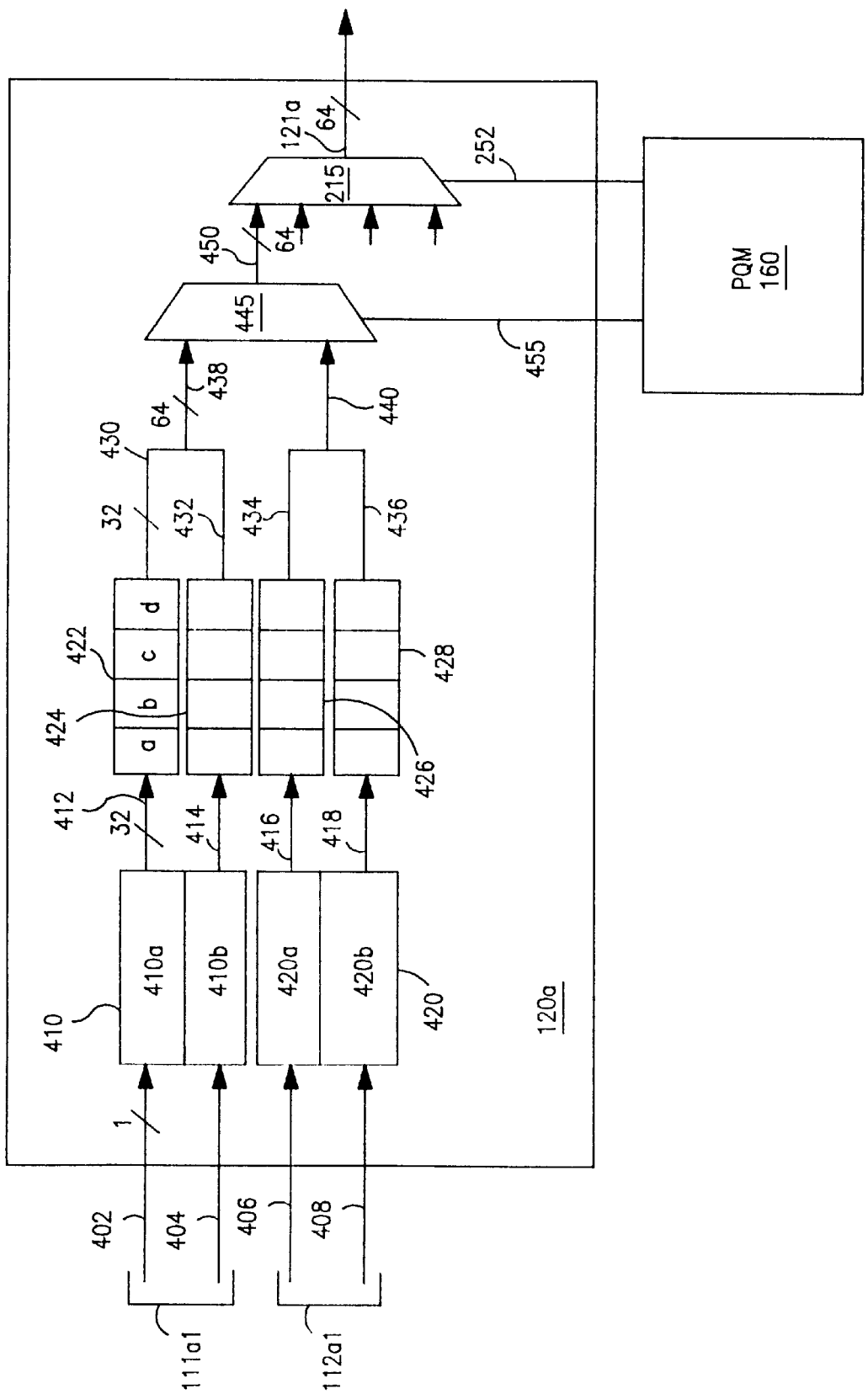
FIG. 4 is a detailed block diagram illustrating a hierarchical selection logic for receiving data packets at a medium access controller and transferring the same to a central shared memory of a LAN switch according to an embodiment the present invention.

FIG. 4 illustrates the two receive data subpaths, 111a1 and 112a1, in a subpath controller according to the eight slice embodiment referenced above and in FIG. 2C. Each subpath has a separate buffer for each single-bit line comprising the subpath. For example, in the eight slice embodiment, each receive or transmit data subpath is 2 bits wide; thus, 2 buffers are provided. FIG. 4 illustrates the two single-bit lines 402 and 404 of receive data subpath 111a1 connected to MAC 110a to collectively receive 2-bit slices of a data packet received at MAC 110a. Likewise, bit lines 406 and 408 collectively receive two-bit slices of data packets received from MAC 110b. As shown, a serial-to-parallel converter, e.g., converter 410a, connected to each single-bit line, e.g., bit line 402, receives bits in serial fashion, and bursts 32 bits in parallel to a First In First Out (FIFO) buffer, e.g., buffer 422. In the embodiment, each FIFO buffer is 32 bits wide by 4 bits deep. However, it is appreciated that FIFOs of other width and/or depth may be utilized.

For purposes of explanation, it is assumed that bit line 402 receives bit position 0 from subpath 111a1 and bit line 404 receives bit position 1 from subpath 111a1 (however, it is appreciated that the two bit subpaths can comprise any two bit positions without departing from the present invention). Thus, FIFO 422 receives bits 0, 32, 64, and 96, etc., of a data packet received from MAC 110a, and FIFO 424 receives bits 1, 33, 65, and 97, etc., of the same data packet. Continuing in this manner, a FIFO (not shown) coupled to the first bit line of subpath 111a2 receives bits 2, 34, 66, and 98, etc., and a FIFO coupled to the second bit line of subpath 111a2 receives bits 3, 35, 67 and 99, etc.

The bits held in each of the FIFOs for a given subpath are interleaved to form an x-bit wide bit stream which is then selected for transfer to packet memory over a respective x-bit wide portion of data bus 121, e.g., data bus 121a. For example, the contents of cell d in FIFOs 422 and 424 are transferred respectively on 32-bit wide lines 432 and 434, and interleaved over 64-bit wide line 438. A hierarchical two-level selection circuit is utilized to select subpath 111a1 or subpath 112a1, depending on which data packet received from MAC 110a or 110b is being written to packet memory 130 under control of PQM 160. At the first level of selection, selector 445 selects either subpath 111a1 or subpath 112a1. In the eight slice embodiment, three other selectors similarly situated with selector 445 select from the remaining 3 pairs of subpaths routed through subpath controller 120a. The output of selector 445 is then transmitted to a second level selector 215, where selector 215 selects one of the four subpaths selected at the first selection level. The slices of a data packet from the subpath selected at the second level is transferred concurrently with other slices of the same data packet from the other subpaths relating to the same path but routed through the other seven subpath controllers. In this manner, a data packet is received at the MAC, partitioned and routed through independent controllers and simultaneously gated into separate memory locations in packet memory 130.

Figure 3:
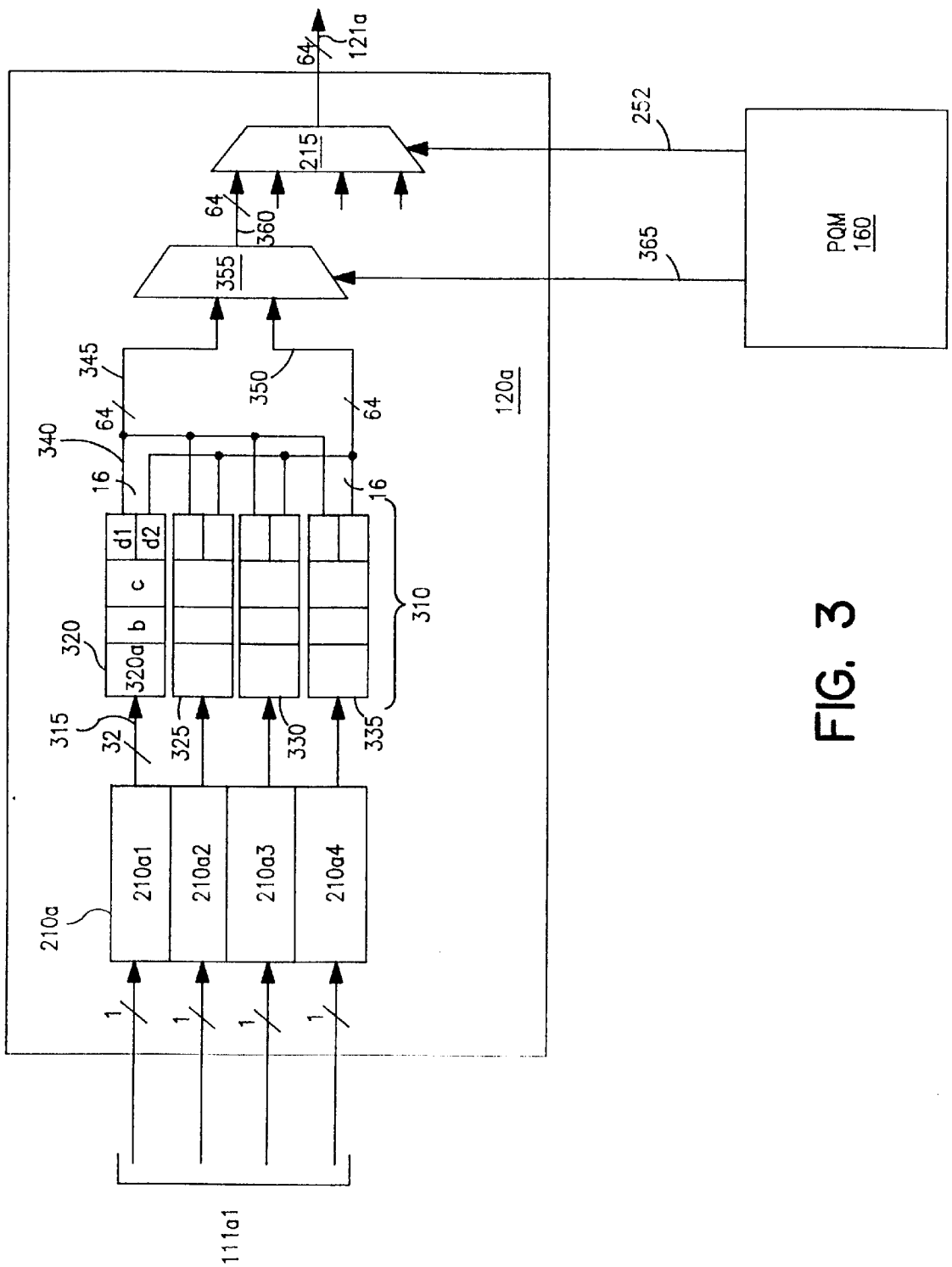
FIG. 3 is a detailed block diagram illustrating a hierarchical selection logic for receiving data packets at a medium access controller and transferring the same to a central shared memory of a LAN switch according to an embodiment the present invention.

In the eight slice embodiment, a residual byte is distributed across four of the eight subpath controllers, 2 bits per subpath. Thus, when PQM 160 gates the contents of those subpaths through the hierarchical selection circuitry shown in FIG. 4, 504 of the 512 bits transferred over bus 121 are wasted. The four slice embodiment illustrated in FIG. 3 handles this situation more efficiently by dividing the 32-bit parallel output of the serial-to-parallel converters in to 16-bit FIFOs.

In the four slice embodiment, for example, subpath 111a1 comprises a 4-bit wide subpath. Each bit line of the subpath is connected to a separate one of serial-to-parallel converters 210a1 through 210a4 in subpath controller 120a. Each of the serial-to-parallel converters is, in turn, coupled via a 32-bit parallel bus to a separate one of 4-bit by 32-bit FIFOs 320 through 335. However, the FIFOs are each divided into two 16-bit FIFOs, e.g., FIFO 320 is divided into FIFOs 320d1 and 320d2. Only the respective halves of each FIFO in the subpath are interleaved so that rather than interleaving four 32-bit FIFOs, essentially only four 16-bit FIFOs are interleaved. Thus, in the four slice embodiment, a residual byte is distributed across two of the four subpath controllers, 4 bits per subpath. When PQM 160 gates the contents of those subpaths through the hierarchical selection circuitry to packet memory, only 248 bits are wasted, due to the FIFO structure and interleaving described above.

Sliced Comparison Engine

A LAN switch implementing the sliced data path controller architecture according to the present invention as described above leverages off the data path architecture to efficiently and quickly perform data packet identification, filtering, forwarding, and other operations related to packet processing, such as queuing data packets into separate queues according to quality of service parameters, specifically, policy based quality of service parameters, and performing statistical analysis or network management functions relating to the data packets. A LAN switch architecture embodying the data path architecture and sliced comparison engine architecture of the present invention supports multiple levels of packet filtering, forwarding, and network layer routing, and further supports network management, statistical analysis, and quality of service applications. This functionality is appropriately based on but not limited to the following well known fields of information stored in the data link, network, transport or other protocol layers:

MAC destination address;
MAC source address;
MAC destination address and Virtual LAN (VLAN);
MAC source address and VLAN;
IP destination address;
IP destination address, IP source address and VLAN;
TCP flow (IP source address, TCP source port, IP destination address, TCP destination port); and
IP destination and IP source address.

With reference to FIGS. 1, 2C, 4 and 5, each data path controller transfers slices of data packets to packet memory 130 each clock cycle, as described above. As the slices of the data packets pass through the data path controller, the packet forwarding controller 150 sends commands to the data path controller via command bus 555 to search for a certain field or group of fields. (It should be noted that although this embodiment primarily contemplates operation of the comparison engine under the control and for the benefit of the forwarding controller, it will be appreciated by those of ordinary skill in the art that other controllers, related to the control of other operations, such as quality of service queueing, network management, statistical analysis, and the like, could utilize the comparison engine described herein.) However, since the data path controller is sliced into a number of subpath controllers according to the data path architecture of the present invention, the packet forwarding controller commands the data subpath controllers to search for particular slices of one or more fields in a data packet. Alternatively, the subpath controllers receive commands from the packet forwarding controller indicating the fields for which to search, and identify the particular slice of a field to search for based on information of which they are aware, such as the position of a given subpath controller with respect to the other subpath controllers in the data path architecture, the bit positions of a well-known field in a data packet, or other information regarding the slice of a particular field that the subpath controller is responsible for processing.

Recall with reference to FIG. 4 that each subpath controller comprises multiple subpaths depending on the degree to which the data path controller is sliced into multiple subpath controllers. For example, in the eight slice embodiment illustrated in FIG. 4, each subpath controller implements eight subpaths, each derived from a separate data path connected to a separate MAC. Each of the subpaths, in turn, is divided into a number of single bit transmission lines, depending on the width of the data path connected to each MAC and the number of subpath controllers. In the eight slice configuration with a data path width of 16 bits, each subpath carries two single bit transmission lines, as illustrated in FIG. 4. Data bits are received in serial fashion over the single bit transmission lines, and buffered in a 4 by 32-bit parallel FIFO as discussed earlier.

Figure 5:
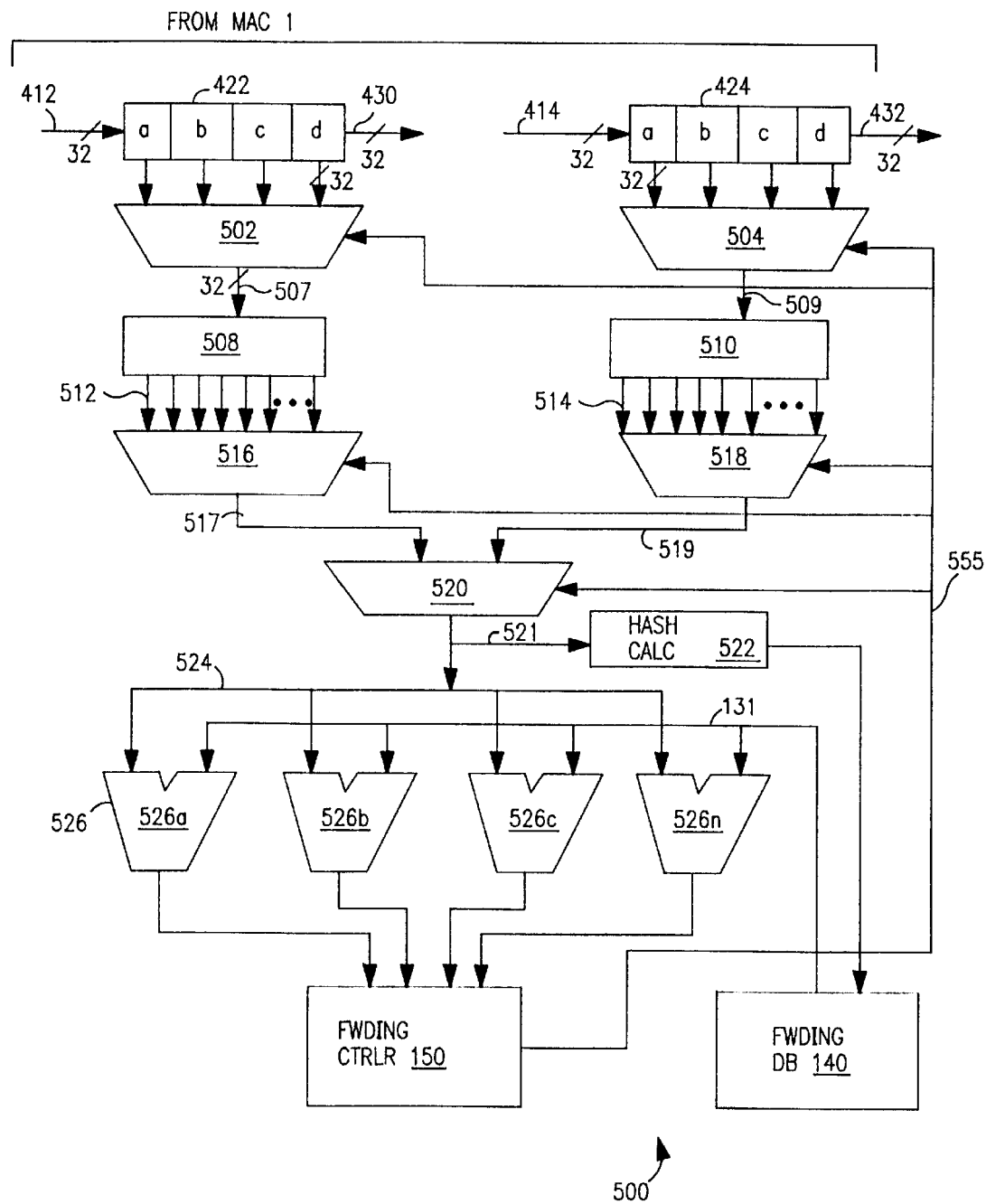
FIG. 5 is a diagram of data selection and comparison logic utilized in forwarding a data packet received at a LAN switch according to an embodiment of the present invention.

According to the comparison engine of the present invention, each 4 by 32-bit FIFO in each subpath controller is connected to a selector to select one of the four 32-bit buffers in the FIFO. For example, in the eight slice embodiment of the data path architecture according to the present invention, and as illustrated in FIG. 5, FIFOs 422 and 424 are respectively coupled to the corresponding two single bit transmission lines 412 and 414 in subpath 210a. Selectors 502 and 504 are respectively coupled to FIFOs 422 and 424 to receive as input the buffers in the FIFO. The buffers each contain 32 discontiguous one bit slices of a data packet. The selectors each have four inputs corresponding to each entry in the FIFO, so that the selectors can retrieve a particular slice or slices of a data packet from the associated FIFO regardless of where the slice is located in the FIFO at the time the selector transfers the slice to the comparison engine logic, according to a control signal provided by the packet forwarding controller. While the embodiment illustrated in FIG. 5 obtains slices of a data packet directly from the FIFOs utilized in the data path architecture, it is understood by those of ordinary skill in the art that a duplicate set of FIFO buffers may be provided to receive slices of a data packet for packet identification and filtering purposes, the tradeoff being memory utilization versus data path controller throughput.

The slices of a data packet are next forwarded by the selector to a buffer. For example, selector 502 forwards slices obtained from one of the entries a, b, c or d in FIFO 422 to buffer 508. Selector 516 then selects portions of a slice related to a well known field. In one embodiment, the selector 516 has an input for each field for which filtering and the like is supported. Thus, selector 516 has an input to receive that portion of the slices in buffer 508 that relate to, for example, a MAC destination address, and another input to receive that portion of the slices in buffer 508 that relate to, for example, an IP destination address, or a TCP flow, etc. Packet forwarding controller 150 provides a control signal to selector 516 to indicate which field to select. The selector 502, buffer 508 and selector 516 combination illustrated in FIG. 5 and described thus far is duplicated for each FIFO of each subpath. Indeed, as illustrated, FIFO 424 is also coupled to transmit slices of a data packet through selector 504 to buffer 510, where portions of the slices related to one or more fields are selected and forwarded by selector 518.

Selector 520 selects the portion of the slices related to field (a "field slice" or "field slices") output by either selector 516 from FIFO 422 or selector 518 from FIFO 424. The field slice is used as a hash key and manipulated by a hashing function at 522 to calculate an index into forwarding database 140 in which is located a table of like fields from which to compare the field slice. If, for example, the field slice obtained at the output of selector 520 is a portion of a MAC destination address, the hashing function calculates an index into the MAC address table in forwarding database 140. If, however, the field slice is part of an IP source address, the hashing function calculates an index into the IP address table in the forwarding database.

In one embodiment, the hashing function provides an index to a hash bucket in a table in forwarding database 140. The size of the hash bucket in the embodiment illustrated in FIG. 5 is 4 entries. Thus, each of the entries in a hash bucket is read from the forwarding database and loaded into a like number of comparators, e.g., comparators 526a through 526n. The field slice is then input to each of the comparators as well and compared against the entries loaded from the table. The results of the comparison are then provided back to the packet forwarding controller, which then aggregates the results with comparisons done on related field slices for the same field in the same data packet in this and other subpath controllers. This process may be repeated for each field against which the data packet is being compared. For example, the comparison logic may search for and compare the contents of a MAC destination address field in a data packet with entries in the forwarding database. If the MAC destination address is found, i.e., if a match of the MAC destination address is found in the forwarding database, then the comparison logic may search for and compare the contents of another field in the data packet, e.g., a MAC source address. The process may continue in this iterative manner for any number of fields in the data packet being searched for.

Alternatively, the field slices obtained at selectors 516 and 518 can first be combined and then compared against entries loaded into comparators from the corresponding table in the forwarding database. The results are then aggregated, either in logic (not shown) or by the forwarding controller 150 to determine whether a particular field being searched for was indeed found by the comparison engine. The forwarding controller then performs the appropriate function as configured in the LAN switch for the identified packet, e.g., filter or forward the data packet. Additionally, the field slices obtained at the output of selectors 516 and 518 can be combined and the combination, in turn, combined with the output of similar logic in the other subpath controllers. The resulting field may then be utilized by a hashing function to produce a key used as an index to the forwarding database. An entry in the database pointed to by the index is then input into the comparators, and a comparison made with the field, and the result sent to the forwarding controller in the same manner as described above.

What is claimed is:

1. A method for controlling processing of data packets in a local area network, hereafter "LAN", switch, comprising:
   a) receiving a data packet;
   b) separating the data packet into a plurality of slices hereafter "data packet slices",
   c) selecting a field in the data packet, the contents of which will determine how to process the data packet;

d) selecting a portion of each of the data packet slices that corresponds to the selected field in the data packet, hereafter "field slice";

e) computing an index to an entry in a table in a memory of the LAN switch;

f) comparing the contents of the field slice to the contents of a field in the entry corresponding to the selected field, for each field slice; and g) controlling processing of the data packet if the contents of the field slice match the contents of the field in the entry corresponding to the selected field, for each field slice.

2. The method of claim 1, wherein computing an index to an entry in a table in a memory of the LAN switch comprises computing an index to an entry in a table in a memory of the LAN switch, for each field slice, utilizing the contents of the field slice as input to the computation.

3. The method of claim 1, wherein computing an index to an entry in a table in a memory of the LAN switch comprises combining each of the contents of the field slice and computing an index to an entry in a table in a memory of the LAN switch, utilizing the combined contents of the field slice as input to the computation.

4. The method of claim 1, wherein selecting a field in the data packet, the contents of which will determine how to process the data packet, comprises selecting a well known field in the data packet.

5. The method of claim 4, wherein the well known field comprises a media access control, hereafter "MAC", destination address field.

6. The method of claim 4, wherein the well known field comprises a media access control, hereafter "MAC", source address field.

7. The method of claim 4, wherein the well known field comprises a media access control, hereafter "MAC", destination address field and virtual LAN field.

8. The method of claim 4, wherein the well known field comprises a media access control, hereafter "MAC", source address field and virtual LAN field.

9. The method of claim 4, wherein the well known field comprises an Internet Protocol, hereafter "IP", destination address field.

10. The method of claim 4, wherein the well known field comprises an Internet Protocol, hereafter "IP", destination address field, IP source address field, and virtual LAN field.

11. The method of claim 4, wherein the well known field comprises an Internet Protocol, hereafter "IP", source address field, Transport Control Protocol, hereafter "TCP", source port field, IP destination address field, and TCP destination port field.

12. The method of claim 4, wherein the well known field comprises an Internet Protocol, hereafter "IP" source address field and IP destination address field.

13. The method of claim 4, wherein selecting a field slice comprises selecting field slices corresponding to a well known field in the data packet.

14. The method of claim 2, wherein computing an index to an entry in a table in a memory of the LAN switch, for each field slice, utilizing the contents of the field slice as input to the computation, comprises:

a) providing the contents of the field slice as input to a hashing function;

b) computing the hashing function;

c) providing a hash key as output to the hashing function; and d) utilizing the hash key as the index to a hash bucket.

15. The method of claim 14, wherein the hash bucket comprises a plurality of entries and utilizing the hash key as the index to a hash bucket comprises utilizing the hash key as the index to the hash bucket comprising the plurality of entries in the table.

16. The method of claim 15, wherein comparing the contents of the field slice to the contents of a field in the entry corresponding to the selected field, for each field slice comprises comparing the contents of the field slice to the contents of a field in each of the plurality of entries in the hash bucket corresponding to the selected field, for each field slice.

17. The method of claim 16, wherein controlling processing of the data packet if the contents of the field slice match the contents of the field in the entry corresponding to the selected field, for each field slice, comprises controlling processing of the data packet if the contents of the field slice match the contents of the field in each of the plurality of entries in the hash bucket corresponding to the selected field, for each field slice.

18. A local area network, hereafter "LAN", switch for controlling processing of data packets in a LAN, comprising: a port for receiving a data packet;

a means for separating the data packet into a plurality of slices, hereafter "data packet slices";

a means for selecting a field in the data packet, the contents of which will determine how to process the data packet;

a means for selecting a portion of each of the data packet slices that corresponds to the selected field in the data packet, hereafter "field slice";

a means for computing an index to an entry in a table in a memory of the LAN switch;

a comparator means for comparing the contents of the field slice to the contents of a field in the entry corresponding to the selected field, for each field slice; and a controller for controlling processing of the data packet in accordance with the configuration of the LAN switch if the contents of the field slice match the contents of the field in the entry corresponding to the selected field, for eac field slice.

19. The LAN switch of claim 18, wherein the means for separating the data packet into data packet slices, comprises a data manipulation device coupled to the port via a data path, the data manipulation device comprising a number of data path controllers each coupled to a separate portion of the data path to receive a slice of the data packet, the data path controllers each comprising a buffer to hold a plurality of slices of the data packet.

20. The LAN switch of claim 18, wherein the means for selecting field slices, comprises a selector having a plurality of inputs, wherein each input receives only data packet slices corresponding to a well known field.

21. The LAN switch of claim 18, wherein the means for computing an index to an entry in a table in a memory of the LAN switch comprises the means for computing an index to an entry in a table in a memory of the LAN switch for each field slice, utilizing the contents of the field slice as input to the computation.

* * * * *